Oct. 27, 1964  R. C. COOPRIDER  3,154,615
METHOD OF MAKING AND ASSEMBLING A LIQUID DISPENSER
Original Filed Dec. 1, 1958  2 Sheets-Sheet 1
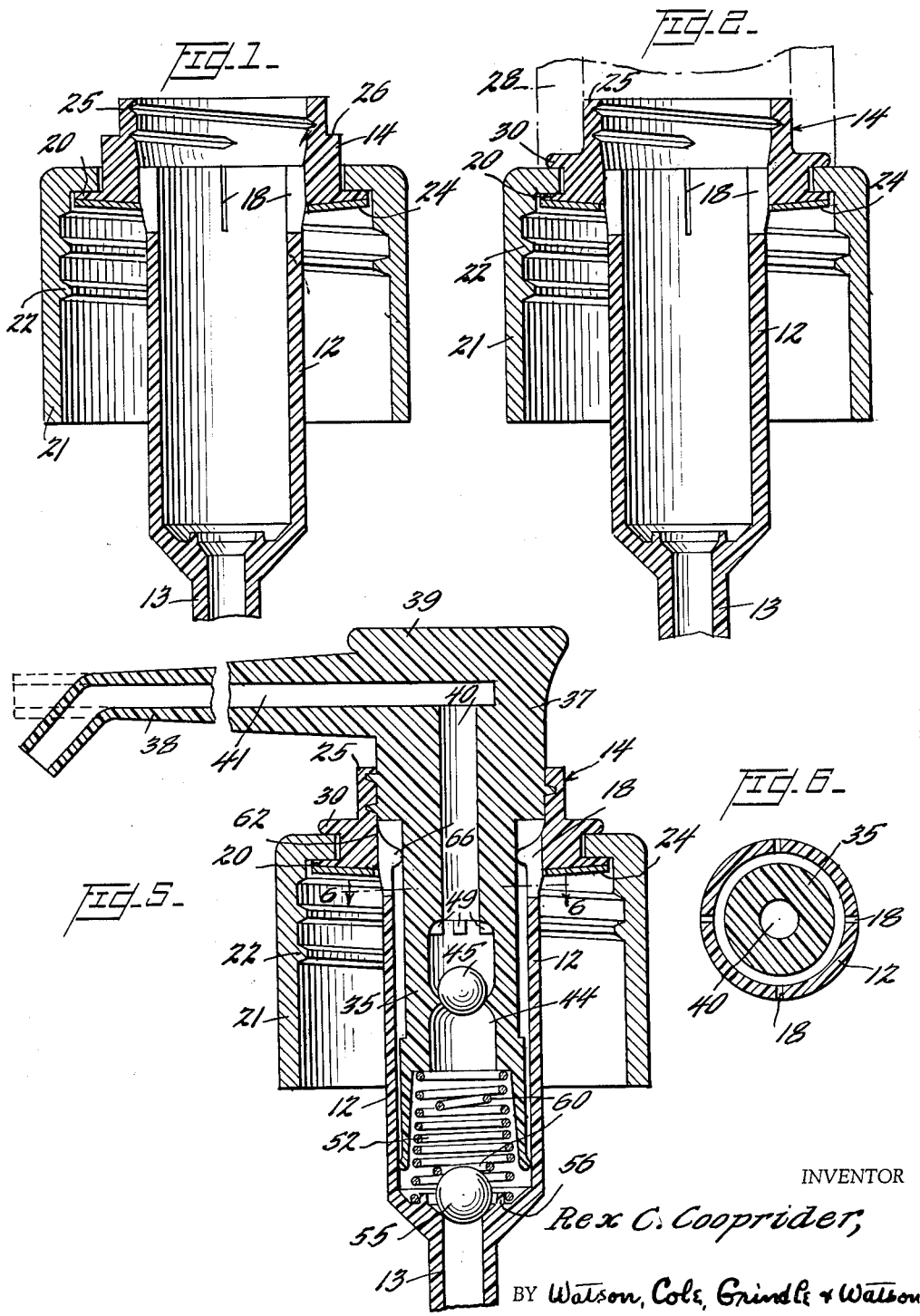
INVENTOR
Rex C. Cooprider,
BY Watson, Cole, Grindle & Watson
ATTORNEYS Oct. 27, 1964    R. C. COOPRIDER    3,154,615
METHOD OF MAKING AND ASSEMBLING A LIQUID DISPENSER
Original Filed Dec. 1, 1958    2 Sheets-Sheet 2
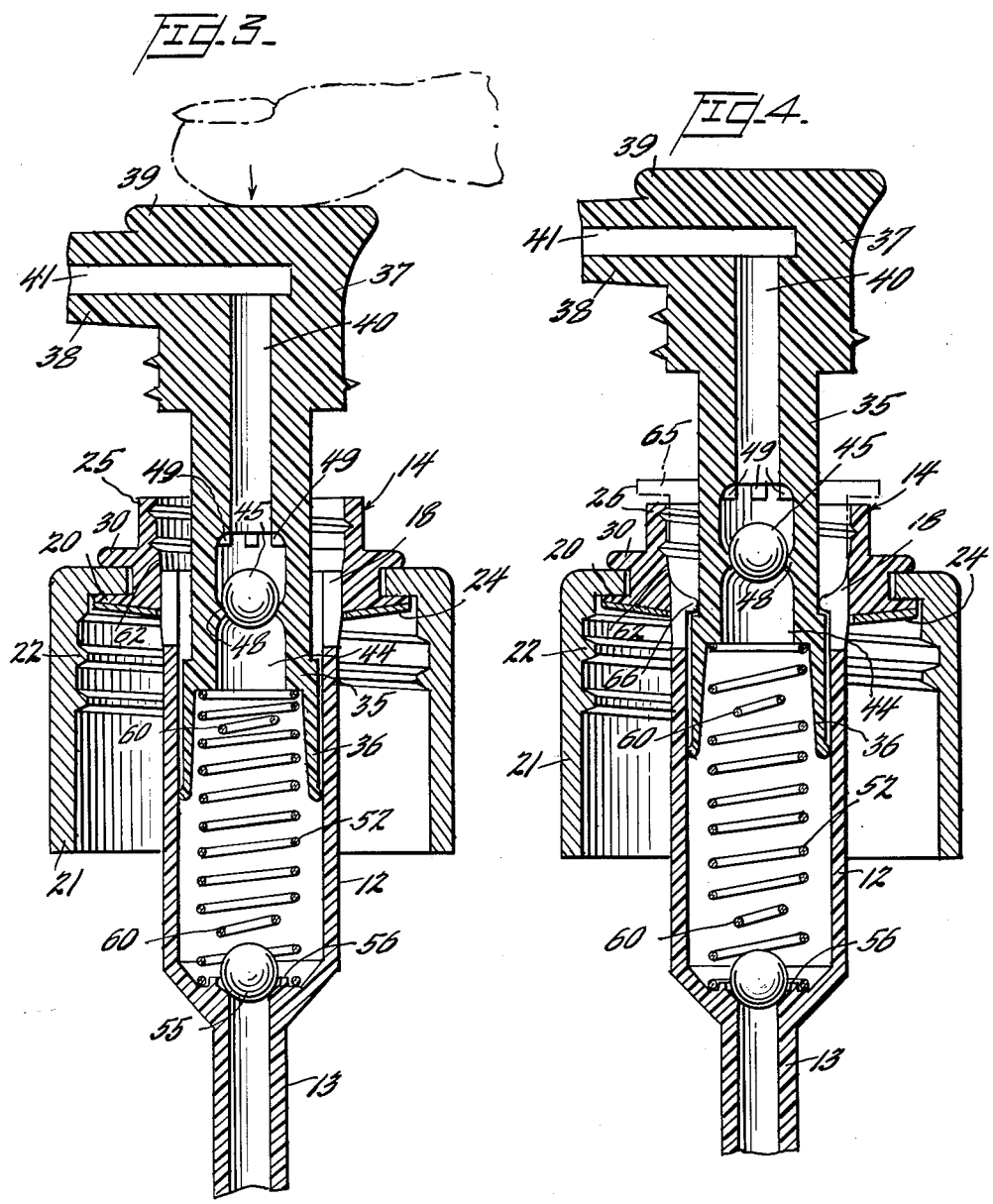
INVENTOR
Rex C. Cooprider,
BY Watson, Cole, Grindle & Watson
ATTORNEYS Patented Oct. 27, 1964

1

3,154,615
METHOD OF MAKING AND ASSEMBLING A LIQUID DISPENSER
Rex C. Cooprider, Downey, Calif., assignor to The Drackett Company, Cincinnati, Ohio, a corporation of Ohio
Original application Dec. 1, 1958, Ser. No. 777,264, now Patent No. 3,062,416, dated Nov. 6, 1962. Divided and this application Aug. 7, 1962, Ser. No. 215,370
2 Claims. (Cl. 264—242)

This invention relates to new and improved methods of making and assembling dispensers of the reciprocating piston type for discharging liquids from portable containers, either as a stream or as a fine spray or mist. This application is a division of my copending application, Serial No. 777,264, filed December 1, 1958, now Patent No. 3,062,416.

It has long been the practice to employ, for the dispensing of liquids from small containers, hand actuated pumps formed of moldable plastic material comprising, in assembled relation, a stationary unit for direct association with the container, and a reciprocable piston unit which is manipulated to effect discharge of the container contents. Each of these units is customarily made of a considerable number of separately formed plastic parts, adhesively secured or bonded together, for instance by a plastic solvent. The separate formation of these various parts and their assembly to form each of the two basic units of the pump is necessarily time consuming and expensive. Furthermore, the bonding of the parts is not invariably perfect, with the result that a significant proportion of the pumps so made are defective.

It is an object of invention to effect substantial simplification of the pumps and of the method of making and assembling the same through initial molding or casting of each of the units, stationary and reciprocable, as a single integral structure, whereby the time consuming and expensive operation of manual assembling of the five or six parts heretofore required in the production of each unit, and the bonding of these parts to form a unitary structure, are eliminated. In the preferred practice of the invention the two units, each integrally molded, are assembled and prepared for mounting on the container by relatively simple operations involving minor deformation of certain portions of the stationary unit.

Further objects and features of the invention will be apparent from the following description, taken in connection with the accompanying drawings, in which:

FIGURE 1 is a longitudinal sectional view of the stationary unit of a dispenser to which the invention may be applied, as molded or cast and prior to deformation;

FIGURE 2 is a sectional view corresponding to FIGURE 1, showing the stationary unit after deformation to secure the same to a container cap;

FIGURE 3 is a longitudinal sectional view showing the stationary and movable units in assembled relation prior to deformation of the stationary unit to provide an interlock between the units for the purpose of maintaining assembled relationship thereof;

FIGURE 4 is a sectional view corresponding to FIGURE 3 at the conclusion of the step of deforming the stationary unit to provide the aforesaid interlock with the reciprocable unit;

FIGURE 5 is a longitudinal sectional view of the completed dispenser showing the two units in collapsed and temporarily locked relation, in which relation they are sealed against leakage for shipping when assembled in a container, and FIGURE 6 is a transverse section taken substantially on the line 6—6 of FIGURE 5.

To promote an understanding of the invention, reference will now be made to the preferred embodiment there-of illustrated in the accompanying drawings, and specific language will be used to describe the same. It will nevertheless be appreciated that no limitation of the scope of the invention is thereby intended, such further modifications and alterations being contemplated as would normally occur to one skilled in the art to which the invention relates.

Referring first to FIGURE 1, in which is illustrated the stationary unit of the dispenser after molding and prior to deformation, it will be perceived that this unit comprises a cylindrical barrel 12, a depending suction tube 13, and a collar portion 14. The collar portion 14 is formed at the upper end of barrel 12, noting that throughout the following description the dispenser will be assumed to occupy the upright position in which it is normally used. Elements 12, 13 and 14 are molded or cast integrally, this being made possible by the contour of the structure, which lends itself well to a single injection molding operation.

The upper end of the barrel 12 is preferably slotted at circumferentially spaced points as indicated at 18 and as shown in FIGURE 6, for the purpose of preventing the formation of an airlock in the barrel 12 above the piston, to permit ingress to the container of air in order to replace discharged liquid, and to allow drainage into the container of liquid which may pass the piston and which would otherwise be trapped in the upper portion of barrel 12.

An annnular flange 20, formed on the collar portion 14, provides a seat for container cap 21. Cap 21 is apertured to receive collar portion 14 and is internally threaded as shown at 22 for cooperative engagement with external threads formed on the neck of the container; the usual gasket 24 is preferably employed beneath flange 20.

The collar portion 14 is further provided at its upper end with an interiorly threaded sleeve portion 25 of reduced diameter, forming a shoulder 26 which is subject to deformation for the purpose of locking the container cap 21 on the collar portion 14.

The manner in which this deformation is effected is shown in FIGURE 2. Thus downward pressure exerted against shoulder 26, for instance by means of a cylindrical tool embracing the sleeve portion 25 and shown in broken lines at 28, deforms or swages collar portion 14 sufficiently to form thereon an annular lip 30 overlying container cap 21, whereby the cap 21 is held on collar portion 14 against displacement, but is rotatable thereon to permit threading of the cap 21 on the container neck.

The stationary and reciprocable units of the dispenser may be formed of any moldable plastic materials, preferably materials commonly designated thermoplastics. Excellent results are achieved by the use of a polyethylene sold under the trade mark "Super Dylan" by Koppers Company, Inc., of Pittsburgh, Pennsylvania. Vinyl chloride acetate is also highly effective, and in general, any plastic material subject to hot or cold flow, capable of being molded and readily deformed after molding in response to heat and/or pressure may be employed.

The reciprocable unit of the dispenser, shown in FIGURES 3 to 5 inclusive of the drawings, is similarly molded in one piece and consists essentially of a plunger 35, a depending hollow piston 36, enlarged at its lower end to engage the interior wall of barrel 12, a head portion 37 and a discharge spout 38, the upper part of the head portion being formed to provide the usual finger piece 39 for depressing the reciprocable unit to pump liquid from the container.

Discharge passage 40, extending upwardly through the plunger 35 and head portion 37, communicates at its upper end with a passage 41 in the discharge spout 38, the spout being molded or cast in the form of a straight tube, and being subsequently deformed by pressure, if desired, so that its outer end is inclined downwardly as shown. Passage 40 is enlarged at 44, adjacent its lower end, to receive a ball valve 45, which is introduced initially through the piston 36 and the lower end of the passage 40 and is pressed into position immediately above an annular valve seat 48 formed in the passage 40, the plunger 35 flexing sufficiently to permit the introduction of the ball valve 45 past the seat and into its operative position. At the upper end of the enlarged portion 44 of passage 40 are formed a plurality of circumferentially spaced lugs 49 which prevent the ball valve 45 from seating in an upward direction. It will be appreciated that ball valve 45 functions in the usual manner as a one-way valve to permit flow of liquid in an upward direction only in passage 40.

Received within piston 36 and seated against the lower end of barrel 12 is a coil compression spring 52, acting to urge the reciprocable unit upwardly, the lower end of the spring being retained against lateral displacement by an annular lip 56 formed at the lower end of barrel 12. Ball valve 55, seating by gravity in the lower end of barrel 12 and acting as a check valve to prevent drainage of liquid downwardly from the barrel 12, is encircled by the annular lip 56. Preferably the seat for ball valve 55 forms an angle of at least 45° with the axis of the dispenser to minimize the possibility of wedging of the valve in its seat; this may cause a tendency of the valve to rattle on the upward stroke of the reciprocable unit. However, annular lip 56, having slight clearance with ball valve 55, functions to prevent such rattling.

Spring 52 is formed with a convolution 60 of reduced diameter, preferably adjacent each end, as shown, to provide reversibility. As will be apparent from FIGURE 5 of the drawing, when the reciprocable unit is fully depressed, the ball valve 55 is engaged by the adjacent small convolution 60 of spring 52 to seat the valve against displacement, thus preventing flow of liquid past the valve and outwardly through passage 40 when the dispenser is inverted. The reciprocable unit is retained in the depressed position by coacting threads formed on the sleeve 25 and the head 37. When the head is screwed down within the sleeve, downwardly tapering surfaces on the head and the sleeve, indicated at 62, are pressed together to prevent discharge of liquid from the container externally of the plunger 35. Thus the container is completely sealed and loss of liquid is prevented during handling and shipping, this being of particular importance when toxic liquids such as insecticides are used.

Returning to FIGURES 3 and 4 of the drawing, which illustrate the method of interlocking the reciprocable and stationary units to prevent withdrawal of the former, it will be observed that FIGURE 3 shows these units assembled so as to position the piston 36 just below the upper end of barrel 12. A cylindrical tool 65, shown in dot-and-dash lines, which is separable on a plane passing through its axis, is assembled around the plunger 35 and is then pressed downwardly against the upper end of barrel 12. The lower end of tool 65 is so shaped as to cause the material of the barrel to flow inwardly, thus providing an inwardly directed part 66 extending into close proximity with plunger 35. In the event the barrel is formed with slots 18, as in the preferred practice of the invention, the part 65 will be discontinuous, but will form in effect an annular guide for the plunger, noting that the slots 18, as shown in FIGURE 6, are quite narrow in order to minimize leakage of liquid from the dispenser by accidental inversion when in use. Inwardly directed part 66 also serves to prevent withdrawal of the reciprocable unit from the stationary unit, thus completing the assembly of the dispenser without the addition of the further parts commonly employed for the guiding and retention of the plunger in the barrel.

In order that plunger 35 may work freely within guide part 66, the plunger diameter may be increased slightly as at 70 adjacent its lower end, i.e., immediately above piston 36, to provide a cylindrical surface against which guide part 66 may be swaged or deformed. Thus, during the major portion of the working stroke of the plunger, guide part 66 will engage with that part of the plunger which is of slightly less diameter, insuring adequate clearance and a free working fit of the plunger within the guide part.

Where the head portion 37 of the pump is formed separately from the plunger, the enlarged portion of the plunger, against which guide part 66 is deformed, may be located adjacent the upper end of the plunger, and the swaging operation performed with the plunger substantially fully depressed. The head is then later applied to the upper end of the plunger.

It will be appreciated that the sequence of steps employed in swaging or deforming the stationary unit to provide the annular lip 30 and to form the inwardly directed part 66 as described is not critical and may be reversed if desired. These steps do not ordinarily require the heating of the parts to be deformed, but where the nature of the material is such that heat is needed, it may be supplied by heating the tools employed to exert pressure on the parts.

In the event it is desired to provide a dispenser capable of discharging liquid in the form of a mist or spray rather than in a stream, appropriate modification of the illustrated embodiment of the invention may be effected without difficulty in accordance with prior art teachings and practice. For instance, the head and spout illustrated herein may be replaced with a one-piece spray head fitted on the upper end of the plunger and formed as described in my pending application, Serial No. 719,427, filed March 5, 1958, now Patent No. 3,075,708, entitled "One Piece Aerosol Spray Head," the only modification required of the spray head therein disclosed being the formation of external threads thereon for engagement with the internal threads of the sleeve 25 as described herein.

The application of the invention to the conventional container cap, formed for threaded engagement with a container neck, is not intended as a limitation of the practice of the invention.

Having thus described the invention, what is claimed as new and desired to be secured by Letters Patent is:

1. In a method of making and assembling a liquid dispenser of the type having a stationary unit comprising a cylindrical barrel and a collar portion at the upper end of said barrel dimensioned for reception in an apertured container cap, and a reciprocable unit comprising a plunger extending through said collar portion of said stationary unit, said plunger being of less external diameter than the internal diameter of said barrel and having at its lower end a piston slidably received in said barrel and at its upper end a head portion, said piston being of greater diameter than said plunger, the steps of molding said stationary unit in one piece from a thermoplastic material, inserting said collar portion of said stationary unit in the aperture of a container cap, deforming said collar portion to provide a retaining lip projecting over said cap, assembling said stationary and reciprocable units by inserting said piston in said barrel and thereafter deforming the upper end of said barrel to provide an inwardly directed part engaging said plunger to afford a bearing for the latter and an abutment preventing withdrawal of said piston from said barrel.

2. In a method of making and assembling a liquid dispenser of the type having a stationary unit comprising a cylindrical barrel having a collar portion at the upper end of said barrel, and a reciprocable unit comprising a plunger extending through said collar portion of said stationary unit, said plunger being of less external diameter than the internal diameter of said barrel and having at its lower end a piston slidably received in said barrel and at its upper end a head portion, said piston being of greater diameter than said plunger, the outer diameter of the plunger being enlarged slightly adjacent one end of the plunger, the steps of molding said stationary unit from a thermoplastic material, assembling said stationary and reciprocable units by inserting said piston in said barrel depressing the plunger to position the portion thereof of enlarged outer diameter in proximity to the upper end of the barrel, and thereafter deforming the upper end of said barrel against the portion thereof of enlarged diameter to provide an inwardly directed part engaging said plunger to afford a bearing for the latter and an abutment preventing withdrawal of said piston from said barrel.

References Cited in the file of this patent

UNITED STATES PATENTS

| | | |
|---|---|---|
| 1,533,619 | Thompson | Apr. 14, 1925 |
| 2,263,731 | Hynek | Nov. 25, 1941 |
| 2,522,439 | Feurer | Sept. 12, 1950 |
| 2,574,744 | Koepke | Nov. 13, 1951 |